United States Patent [19]
Grünthaler et al.

[11] Patent Number: 6,077,815
[45] Date of Patent: Jun. 20, 2000

[54] LAMINATED MATERIAL FOR SLIDING MEMBERS, AND PROCESS FOR THE PRODUCTION THEREOF

[75] Inventors: Karl-Heinz Grünthaler, Usingen; Klaus Staschko, Idstein, both of Germany

[73] Assignee: Glyco-Metall-Werke Glyco B.V. & Co. KG, Wiesbaden, Germany

[21] Appl. No.: 09/000,433
[22] PCT Filed: May 24, 1997
[86] PCT No.: PCT/DE97/01018
  § 371 Date: Jan. 30, 1998
  § 102(e) Date: Jan. 30, 1998
[87] PCT Pub. No.: WO97/46737
  PCT Pub. Date: Dec. 11, 1997

[30] Foreign Application Priority Data

Jun. 1, 1996 [DE] Germany ............. 196 22 166

[51] Int. Cl.[7] .............. C25D 7/10; C25D 15/00; F16C 33/00
[52] U.S. Cl. ............ 508/108; 508/103; 508/107; 156/150; 205/80; 205/109
[58] Field of Search .................... 508/108

[56] References Cited

U.S. PATENT DOCUMENTS

| | | | |
|---|---|---|---|
| 4,652,349 | 3/1987 | Behringer et al. | 204/44.4 |
| 4,847,135 | 7/1989 | Braus et al. | 428/138 |
| 5,137,792 | 8/1992 | Hodes et al. | 428/614 |
| 5,278,109 | 1/1994 | Ono et al. | 501/87 |
| 5,732,322 | 3/1998 | Nakamaru et al. | 428/550 |

FOREIGN PATENT DOCUMENTS

| | | |
|---|---|---|
| 0 709 493 A2 | 5/1996 | European Pat. Off. . |
| 07252693 | 10/1995 | Japan . |

OTHER PUBLICATIONS

Sadowska–Mazur et al, A Preliminary Study of the Electrodeposition of Tin and Non–Metallic Particles, Plating and Surface Finishing, 72, pp. 120–125, May 1985.

*Primary Examiner*—Ellen M. McAvoy
*Attorney, Agent, or Firm*—Reising, Ethington, Barnes, Kisselle, Learman & McCulloch P.C.

[57] ABSTRACT

A laminated material for sliding members having improved resistance to abrasion, hardness and wear resistance. The laminated material has a support structure and a sliding layer with electrodeposited matrix material, hard particles being embedded into the matrix material, having a diameter of <2 $\mu$m and being provided in the form of individual particles distributed in a completely homogenous manner with a proportion of 2 to 20% by volume in the matrix material. The process to produce sliding members provides that a ternary electroplating bath free of fluoro-borate and without brighteners, using non-ionic surfactants and free alkyl sulphonic acids, and a grain refining agent and a fatty acid polyglycol ester is used. The hard particles are kept in the electroplating bath during electroplating at a steady concentration.

18 Claims, 2 Drawing Sheets

01# LAMINATED MATERIAL FOR SLIDING MEMBERS, AND PROCESS FOR THE PRODUCTION THEREOF

BACKGROUND OF THE INVENTION

1. Field of the Invention

The invention relates to a multilayer material for sliding elements which comprises at least a backing member and an overlay comprising electrodeposited tin-based metal matrix material, especially of SnCuNi, PbSnCu, PbSn, Sn, SnCu or CuSn, hard particles being embedded in the matrix material. The invention also relates to a process for producing such sliding elements.

2. Description of Related Art

Sliding elements include all types of bearing shells as well, inter alia, as pistons and piston rings. Overlays of multilayer materials for sliding elements are generally produced by electroplating in appropriate electrolyte baths.

It is known moreover, for example from "*Oberflächen- und Dünnschichttechnologie*" ("Surface and thin-layer technology"), part 1, Plating of Surfaces, by Rene A. Häfer, Springer-Verlag 1987, pages 198 to 200, to modify the characteristics of electrodeposited metal layers for example by adding hard materials or sliding materials to the electrolytes in the form of powdery particles and then depositing them on the substrate together with the metal. During electrolysis, the suspended particles migrate to the cathode, where they are incorporated in the metal being deposited. In this connection, it is attempted to incorporate particles which are as small as possible into the metal matrix, because in this way dispersion hardening is achieved, whereby hardness, wear resistance and strength are improved above all at elevated temperatures.

However, these possibilities exist only in theory, because the surface energy of the particles is greater, the smaller the diameter of the particles. The consequence thereof is the formation of agglomerates in the electrolytes, wherein air pockets form between the particles which, upon incorporation of the agglomerates into the matrix, result in lattice defects and thus in brittleness of the overlay.

In "*Developments in Tri Metal Bearings*", paper 2 by T & N, 1995, this problem is discussed and a suggestion made of a promising process in the form of an agitation process with, which cluster formation could be limited to the size of from 2 to 3 μm.

Fluoroborate baths have been used hitherto as the electrolyte, but have the disadvantage that the particles are only inadequately wetted, the consequence of which is that, even when a large number of hard particles are available in the electrolyte, only a limited amount, as a rule up to a maximum of 2 vol. %, may be incorporated into the matrix.

Moreover, overlays, especially ternary layers, produced with known baths sometimes exhibit considerable variations in thickness, which may possibly necessitate post-machining of the sliding elements. Furthermore, the tin is not evenly dispersed in the overlay, which may cause the formation of clusters and coarse crystalline deposits, known as tin agglomerations. This inhomogeneous structure of the overlay promotes diffusion, which occurs when the sliding element is exposed to relatively high heat levels during operation, such that such overlays may only be applied to an intermediate layer, such as a nickel barrier for example, which prevents tin diffusion into the lead-bronze layer thereunder, as described, for example, in E. Römer "*Werkstoff und Schichtaufbau bei Gleitlagern*" ("Material and Layer Structure in Plain Bearings"), an offprint from *ZFW Zeitschrift für Werkstofftechnik* ("Journal of Materials Technology"), volume 4, issue 7, Verlag Chemie Weinheim/ Bergstraße 1973. Only through this additional measure has it hitherto been possible to improve corrosion resistance and to prevent detachment phenomena in the overlay, which may lead to bearing damage. Moreover, the hardness of these known overlays and thus their wear resistance are inadequate.

SUMMARY OF THE INVENTION

It is therefore the object of the invention to provide a multilayer material which is improved with respect to wear resistance, hardness and abrasive resistance. It is also the object of the invention to provide a corresponding process for producing such sliding elements.

This object is achieved with a multilayer material comprising hard particles with a diameter <2 μm and contained in a tin-based metal matrix material (i.e., a metal matrix of tin or alloys containing tin) in a proportion of from 2 to 20 vol. %, wherein the hard particles are present as completely homogeneously dispersed individual particles. The figure of <2 μm means that this diameter value relates to at least 95% of the hard particles used.

The hard particles are preferably carbides, oxides, borides, nitrides, silicides or silicon. A summary of the preferred hard particles is given in the Table below:

Solids (Hard Material Particles) to be Embedded
Carbides: Sic, $B_4C$, $Cr_{23}C_6$, TaC, TiC, WC, ZrC
Oxides: $Al_2O_3$, $Cr_2O_3$, $Fe_2O_3$, $SiO_2$, $TiO_2$, $ZrO_2$
Nitrides: BN (hexagonal), BN (cubic), $Si_3N_4$, AlN
Borides: $Cr_3B_2$, $TiB_2$, $TaB_2$
Silicides: $TaSi_2$, $Fe_4Si_3$ The tin is advantageously present in the remaining tin-based matrix material as a completely homogeneously dispersed finely crystalline deposit, if the matrix material consists, for example, of SnCuNi, PbSn, SnCu, CuSn or PbSnCu. The finely, crystalline deposition and completely homogeneous dispersion of the tin means that localised tin agglomeration no longer occurs. In electron micrographs with up to 1000-times enlargement it is not possible to identify the finely dispersed tin as particles with defined diameters. Consequently, there are fewer lattice defects and no incorporation of disturbing foreign atoms in the overlay, such that packing density is far higher than with known overlays. The result is greater overlay hardness.

Through the incorporation of hard particles with a diameter of <2 μm, hardnesses are obtained for the overlay of from 10 to 50 HV.

Moreover, it has been noted that tin diffusion, which usually occurs as a result of the increase in temperature during operation of the plain bearings made of such multilayer materials, is observed far less or not at all. This advantageous effect is also a result of the finely crystalline deposition of the tin and the hard particles present as completely homogeneously dispersed individual particles, which obviously restrict the mobility of the tin to such an extent that only slight diffusion effects can occur, or indeed none at all. It is thus possible to dispense with an intermediate layer, such as a so-called nickel barrier for example. If the overlay forms the ternary layer of a multilayer material, it may preferably be applied directly to the sintered layer, especially a lead-bronze layer.

The production process is characterised in that a ternary, fluoroborate-free electroplating bath without brighteners is used, to which are added non-ionic wetting agents and free alkylsulphonic acid as well as a fatty acid polyglycol ester and a grain refining agent comprising a carboxylic acid and in that the hard particles are kept in a constant concentration in the electroplating bath during the electroplating process.

It has surprisingly emerged that, through the use of fluoroborate-free electroplating baths to which are added non-ionic wetting agents, scattering of the hard particles occurs as early as in the electroplating bath, such that then, even during electrodeposition, the appropriately fine dispersion may be retained without agglomerate formation. In this connection, it has been shown that hard particles with a preferred diameter of <2 μm may be processed without difficulty.

In order to achieve high contents of hard particles in the matrix, the hard particles have to be held at a suitably higher and particularly constant concentration in the electroplating bath during the electroplating process. This makes it possible to increase the proportion of hard particles in the matrix material to up to 20 vol. %. The advantage of the hard particles is not only that they reduce wear, but in particular that they prevent tin diffusion. The particles are particularly effective as a barrier for the tin when they are present in the matrix material in the form of finely dispersed individual particles. The hard particles may therefore be described as a type of diffusion barrier which, as a foreign body in the overlay, prevents movement of the tin particles.

The fatty acid polyglycol ester has a positive effect on deposition uniformity. While in known processes marked elevations occurred in the edge areas of grooves, bores and the like, these can no longer be detected. The fatty acid polyglycol ester obviously has an effect on the ion distribution in the electroplating bath, which also leads, in the end, to more uniform deposition. It has been shown that it is not only possible to avoid variations in thickness, but also to reduce surface roughness markedly.

The electroplating bath preferably comprises a methane sulphonic acid.

In addition to the metals and hard particles to be deposited, a preferred bath composition comprises 30 to 200 g/l of free methane sulphonic acid, 5 to 125 ml/l of non-ionic wetting agent, 5 to 25 ml/l of grain refining agent and 0.01 to 1 g/l of fatty acid polyglycol ester.

The non-ionic wetting agents used are preferably aryl polyglycol ether and/or alkylaryl polyglycol ether of the formula $C_nH_{(n+1)}$—Ar—$(OCH_2$—$CH_2)_m$—$OCH_2$—$CH_3$, where n=0 to 15, m=5 to 39 and Ar is an aromatic residue.

The grain refining agent preferably comprises an -β-unsaturated carboxylic acid of the general formula

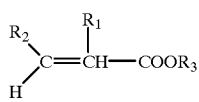

where $R_1$ and $R_2$ are the same or different and hydrogen or lower alkyl groups with from 1 to 3 C atoms and $R_3$ is hydrogen or lower alkyl with from 1 to 5 C atoms.

The electroplating baths according to the invention are distinguished by high stability, since the alkyl sulphonic acid does not decompose during electrolysis. Uniform, virtually 100% current efficiency is thereby obtained at both the cathode and the anode.

During electroplating it is preferably possible for current densities of from 2 to 20 A/dM² to be used. No alterations in the plating composition were detected as a result. Through the use of such high current densities, the advantage of rapid deposition is achieved. It is therefore possible to reduce the duration of the process almost by a factor of 10. The new process is therefore also suitable for high-speed deposition and thus for electroplating of a strip. It is thus possible to set up high capacity mass-production.

The electroplating bath is preferably kept at a temperature of below 25° C., because otherwise controlled deposition is no longer possible. Since the bath heats up during the electroplating process, it has to be cooled accordingly.

BRIEF DESCRIPTION OF THE DRAWINGS

Exemplary embodiments will be described in more detail below with the aid of the Figures, in which.

DETAILED DESCRIPTION OF THE PREFERRED EMBODIMENTS

Figure 1A:
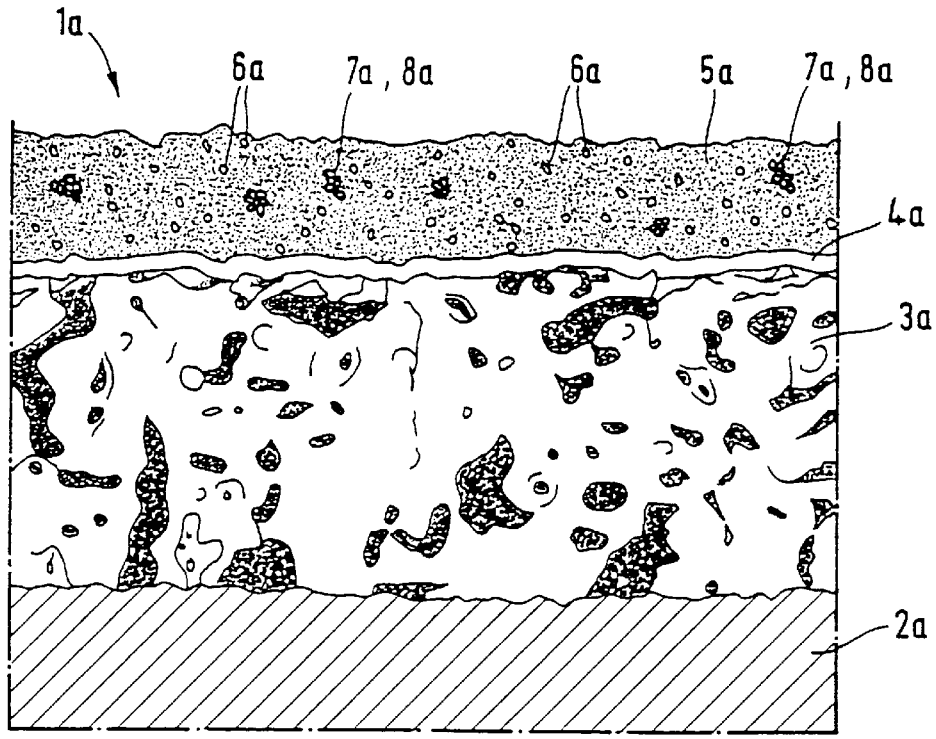
FIGS. 1a, b are electron micrographs of a multilayer material according to the prior art and according to the invention, and FIGS. 2a, b are two diagrams which show the surface roughness of an overlay according to the prior art and according to the invention.
Figure 1B:
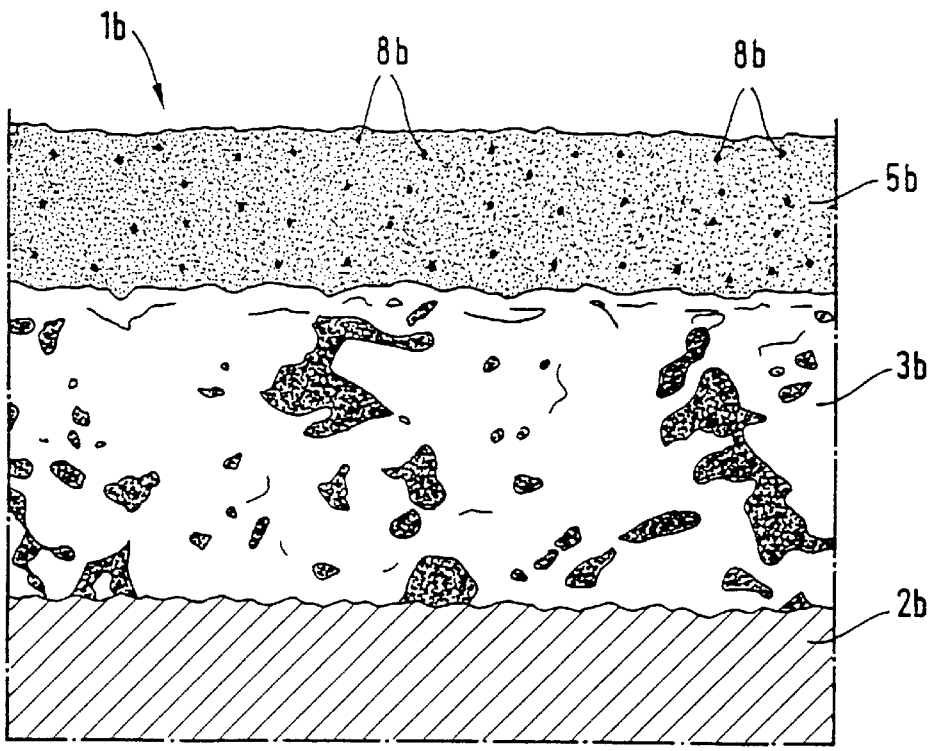

FIGS. 1a and 1b represent two photomicrographs, FIG. 1a showing a multilayer material according to the prior art and FIG. 1b one such according to the invention.

FIG. 1a shows a multilayer material 1a, which comprises a steel backing 2a, a lead-bronze layer 3a, a nickel barrier 4a and a ternary layer 5a. The ternary layer has the composition PbSn14Cu8 with embedded α-$Al_2O_3$ dispersoids, which are present in the ternary layer 5a substantially in the form of agglomerates 7a. This ternary layer was produced with a fluoroborate-containing electroplating bath. Tin clusters 6a can also clearly be seen in the ternary layer. Overall, the ternary layer 5a has an inhomogeneous structure and a rough surface.

FIG. 1b shows a multilayer material 1b according to the invention. On the steel backing 2b there is again located a lead-bronze layer 3b, on which there is directly applied, i.e. without nickel barrier, the ternary layer 5b, whose matrix material consists of PbSnCu in accordance with the matrix material of the ternary layer 5a in FIG. 1a. In the thousand-times enlargement shown here the tin may be clearly seen as a finely crystalline, homogeneously dispersed deposit and the hard particles 8b, which exhibit a diameter <2 μm, are also no longer present in the ternary layer 5b in the form of agglomerates, but rather as homogeneously dispersed individual particles.

Overall, the ternary layer 5b exhibits good bonding and no tin diffusion could be detected even after heat treatment at 170° C. for 1000 hours. The hardness of this ternary layer 5b is 38 HV.

Figure 2A:
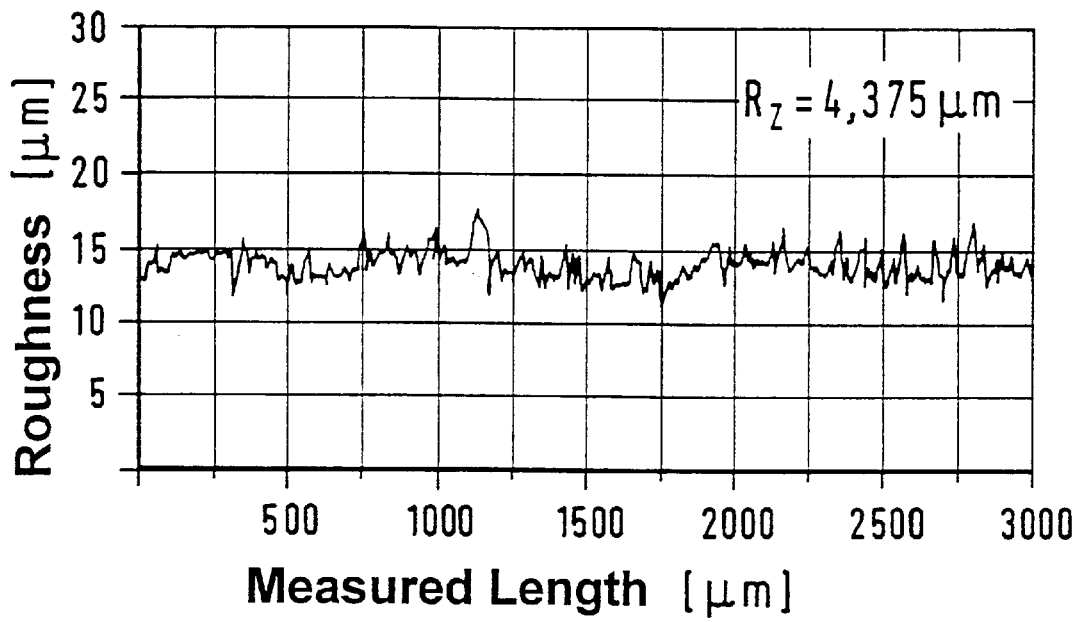
Figure 2B:
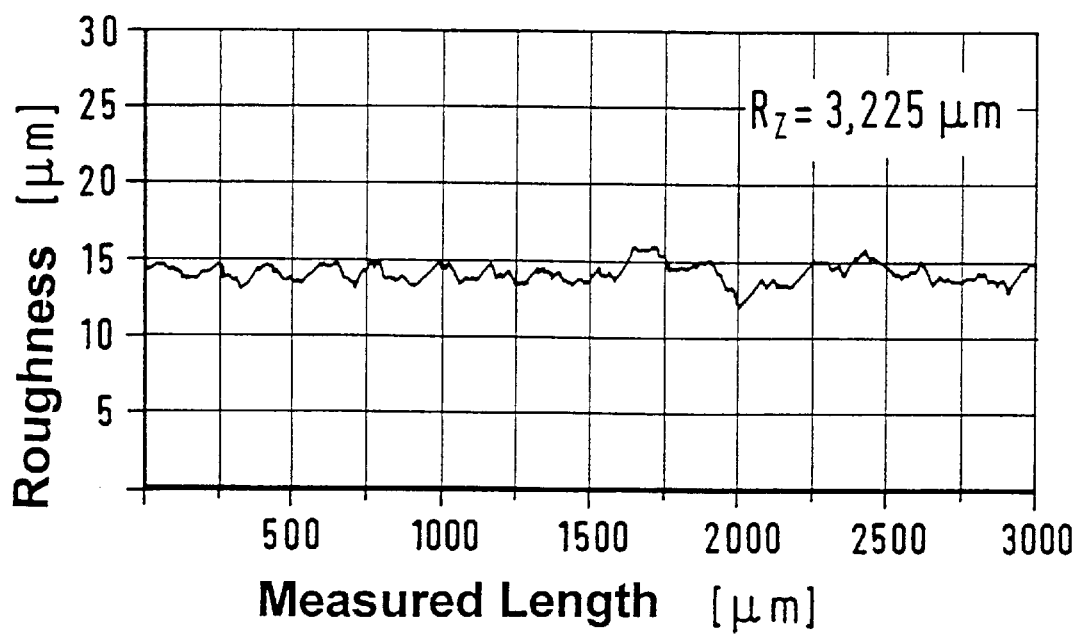

FIGS. 2a and 2b illustrate the surface roughness of the multilayer materials shown in FIGS. 1a and 1b. It may be clearly seen that the surface roughness shown in FIG. 2a, which relates to the multilayer material according to FIG. 1a, is far greater than that of FIG. 2b. The average roughness was RZ 4.375 μm for the graph shown in FIG. 2a and RZ 3.225 82 m for the graph shown in FIG. 2b.

An example of a bath composition for the system PbSnCu-α-$Al_2O_3$ is as follows:

| | |
|---|---|
| Total quantity | 250 l |
| Pb | 50–100 g/l |
| Sn | 6–20 g/l |

-continued

| | |
|---|---|
| Cu | 2–16 g/l |
| free methane sulphonic acid | 100–160 g/l |
| wetting agent N | 40–100 ml/l |
| wetting agent L | 5–25 ml/l |
| wetting agent based on polyglycol ether | 0.01–0.05 g/l |

Wetting agent N designates a wetting agent based on alkylaryl polyglycol ether and wetting agent L designates an additive comprising, in addition to the 30% carboxylic acid, up to a third of aryl polyglycol ester and/or alkylaryl polyglycol ether, the rest being water. These wetting agents are sold, for example, by Blasberg/Solingen under the Trade Names BN 160308 Stannosar HMB and BN 160309 Stannosar HMB respectively.

The content of $\alpha$-Al$_2$O$_3$ solids in the electrolyte was increased from 20–100 g/l in several stages, the respective concentration in the electroplating bath being kept constant during the electroplating process. The results are assembled in the following Table.

| Test | Content of $\alpha$Al$_2$O$_3$ solids in the electrolyte | Proportion of hard particles in the overlay |
|---|---|---|
| 1 | 20 g/l | 2.7 vol. % |
| 2 | 50 g/l | 4.8 vol. % |
| 3 | 100 g/l | 9.7 vol. % |

With a constant supply of 100 g/l of hard particles, it was possible to incorporate into the ternary layer a content of 9.7 vol. %, which is not possible with the process according to the prior art. The diameter of the hard particles used was below 2 $\mu$m.

The following deposition table was also drawn up with a bath of the above-mentioned composition, this deposition table being valid irrespective of the proportion of hard particles in the electrolyte.

Deposition Table

| Exposure time in mins. | 2 A/dm$^2$ | 3 A/dm$^2$ | 5 A/dm$^2$ | 10 A/dm$^2$ | 20 A/dm$^2$ |
|---|---|---|---|---|---|
| 15 | 16 $\mu$m | 25 $\mu$m | 40 $\mu$m | 80 $\mu$m | 160 $\mu$m |
| 30 | 32 $\mu$m | 50 $\mu$m | 80 $\mu$m | 160 $\mu$m | 320 $\mu$m |
| 60 | 64 $\mu$m | 100 $\mu$m | 160 $\mu$m | 320 $\mu$m | 640 $\mu$m |

Hardness measurements and wear tests were carried out on the PbSn14Cu8 system. Without hard particles, the hardness of the ternary layer was 22 HV. With an Al$_2$O$_3$ content of 4.8 vol. %, it was possible to increase hardness to 37 HV.

After a running time of 130 hours under a specific load of 65 MPa, wear of 0.001 mm was detected in the PbSnCu system without hard particles. If the specific load was raised to 80 MPa, wear of 0.004 mm arose after a running time of only 60 hours.

In contrast thereto, the PbSnCu system including hard particles of Al$_2$O$_3$ did not exhibit any wear at all.

Lead-free SnCuNi system overlays were examined in a further test. Deposition was again effected from a methane sulphonic acid system. An example of electrolyte composition is as follows:

| | |
|---|---|
| Sn | 40–60 g/l |
| Cu | 2–8 g/l |
| nickel | 0.5–2 g/l |
| free methane sulphonic acid | 80–160 g/l |
| wetting agent N | 40–100 ml/l |
| wetting agent L | 5–25 ml/l |
| polyglycol ether | 0.01–0.05 g/l |

$\alpha$-Al$_2$O$_3$ particles with a diameter <2 $\mu$m were again used as the hard particles. The hard particle content in the electrolyte was again 20–100 g/l. Here also, it could be noted that up to 10 vol. % of hard particles may be incorporated into the ternary layer. Tests with 150 and 200 g/l of hard particles resulted in contents of 15 and 19 vol. % of hard particles respectively in the ternary layer.

Obviously, many modifications and variations of the present invention are possible in the light of the above teachings. It is, therefore, to be understood that within the scope of the appended claims, wherein reference numerals are for convenience and not to be considered in any way limiting, the invention may be practiced otherwise than as specifically described.

What is claim is:

1. A multilayer material for sliding elements comprising: a metallic backing member, and an overlay electrodeposited on said backing member having a tin-based electrodeposited metal matrix and hard particles embedded in said matrix, and characterized by said hard particles having a diameter less that about 2 $\mu$m and being homogeneously dispersed throughout said matrix as individual particles and present in a proportion of about 2 to 20 vol. % of said metal matrix.

2. The multilayer material of claim 1 further characterized by said tin-based matrix comprising at least one material selected from a group of materials consisting of: SnCuNi, PbSnCu, PbSn, Sn, SnCu, and CuSn.

3. The multilayer material of claim 2 further characterized by said Sn being present in said matrix as a homogeneously dispersed finely crystalline deposit when said matrix is selected from said group of materials other than Sn.

4. The multilayer material of claim 1, further characterized by said hard particles comprising at least one material selected from the group consisting essentially of: carbides, oxides, borides, nitrides, silicides and silicon.

5. The multilayer material of claim 1 wherein said dispersion of hard particles provides a diffusion barrier precluding the diffusion of Sn particles from said overlay.

6. The multilayer material of claim 5 further characterized by said backing member comprising a sintered layer and said tin-based overlay being applied directly to said sintered layer.

7. A sliding element comprising; a metallic backing member, and an overlay electrodeposited on said backing member comprising a tin-based electrodeposited metal matrix of at least one material selected from the group consisting of: SnCuNi, PbSnCu, PbSn, Sn, SnCu, and CuSn, and hard particles embedded in said metal matrix comprising at least one material selected from the group consisting of: carbides, oxides, brides, nitrides, silicides and silicon, and wherein said hard particles have a diameter less than about 2 $\mu$m and are homogeneously dispersed throughout said matrix as individual particles and present in a proportion of about 2 to 20 vol % of said matrix, and said Sn being present in said matrix material as a homogeneously dispersed finely crystalline deposit.

8. The sliding element of claim 7 further characterized by said element being free of a tin diffusion barrier layer between said overlay and said backing member and wherein said dispersion of said hard particles of said matrix presents a barrier precluding diffusion of said Sn from said overlay to said backing layer.

9. A method of fabricating sliding elements comprising preparing a metallic backing member, and characterized by electroplating a metallic overlay onto said backing member to provide a tin-based electrodeposited metal matrix of at least one material selected from the group of materials consisting of: SnCuNi, PbSnCu, PbSn, Sn, SnCu, and CuSn having hard particles embedded therein with a diameter less than about 2 μm and being homogeneously dispersed throughout the matrix as individual particles and being present in a proportion of about 2 to 20 vol. % of the matrix.

10. The method of claim 9 further characterized by electroplating the overlay from a ternary, fluoroborate-free electroplating bath free of brighteners and including at least one non-ionic wetting agent, free alkylsulphonic acid, a fatty acid polyglycol ester, and a grain refining agent, and maintaining a constant concentration of hard particles in the bath during the electroplating process.

11. The method of claim 10 further characterized by employing carboxylic acid as the grain refining agent.

12. The method of claim 10 further characterized by limiting the hard particles used in the bath to those having a diameter less than about 2 μm.

13. The method of claim 10 further characterized by selecting the electroplating bath to include methane sulphonic acid.

14. The method of claim 10 further characterized by providing the electroplating bath with about 30–200 g/l of free methane sulphonic acid, about 5–125 ml/l of the non-ionic wetting agent, about 5–25 ml/l of the grain refining agent, and about 0.01 to 1 g/l of the fatty acid polyglycol ester.

15. The method of claim 14 further characterized by selecting the non-ionic wetting agent from a group consisting essentially of: polyglycol ether and alkylaryl polyglycol ether.

16. The method of claim 10 further characterized by plating the overlay at a current density of about 2 to 20 A/dm$^2$.

17. The method of claim 10 further characterized by agitating the electroplating bath during the electroplating process.

18. The method of claim 10 further characterized by maintaining the electroplating bath at a temperature below about 25° C.

* * * * *